United States Patent
Straub

[11] Patent Number: 5,280,970
[45] Date of Patent: Jan. 25, 1994

[54] PIPE COUPLING

[75] Inventor: Immanuel Straub, Wangs, Switzerland

[73] Assignee: Straub Federnfabrik AG, Wangs, Switzerland

[21] Appl. No.: 988,721

[22] Filed: Dec. 10, 1992

[30] Foreign Application Priority Data

Jan. 7, 1992 [CH] Switzerland ............... 00015/92

[51] Int. Cl.⁵ ........................................ F16L 17/025
[52] U.S. Cl. ................................. 285/112; 285/373
[58] Field of Search ............. 285/367, 112, 410, 411, 285/373; 24/20 L S, 279, 280, 281, 282, 283, 284, 285, 286

[56] References Cited

U.S. PATENT DOCUMENTS

| | | |
|---|---|---|
| 2,073,294 | 3/1937 | Caillau ............ 24/279 |
| 3,507,314 | 4/1970 | Zartler ............ 24/279 X |
| 3,861,723 | 1/1975 | Kunz et al. ........... 285/410 |
| 3,877,733 | 4/1975 | Straub . |
| 4,664,422 | 5/1987 | Straub ............. 285/112 |
| 5,137,305 | 8/1992 | Straub . |

FOREIGN PATENT DOCUMENTS

| | | |
|---|---|---|
| 0079457 | 5/1983 | European Pat. Off. . |
| 0286561 | 3/1988 | European Pat. Off. . |
| 1425616 | 11/1969 | Fed. Rep. of Germany . |
| 8512007.3 | 7/1985 | Fed. Rep. of Germany . |
| 573696 | 8/1945 | United Kingdom . |
| 573695 | 12/1945 | United Kingdom . |
| 573698 | 12/1945 | United Kingdom . |

*Primary Examiner*—Dave W. Arola
*Attorney, Agent, or Firm*—Willian Brinks Hofer Gilson & Lione

[57] ABSTRACT

An elastomeric sealing sleeve 6 is enclosed by an annular housing 1 which is split longitudinally and can be drawn together in the peripheral direction by means of a clamping screw 22. The clamping screw 22 passes with clearance through two U-shaped clamping members 16, 17 which are accommodated in clamping brackets 12, 13 fastened to the housing 1. The clamping members 16, 17 are supported with the ends of their legs on flat wall sections 12a, 13a of the clamping brackets 12, 13. The head 24 as well as a nut 25 of the clamping screw 22 bear against arched supporting surfaces 20a of the clamping members 16, 17. While the housing 1 is being drawn together, the clamping members 16, 17 can move relative to the shank 23 of the clamping screw 22, in the course of which the screw head 24 and the nut 25 can roll on the arched outer surface 20a. The screw shank 23 is therefore subjected to little or no bending stress.

7 Claims, 1 Drawing Sheet

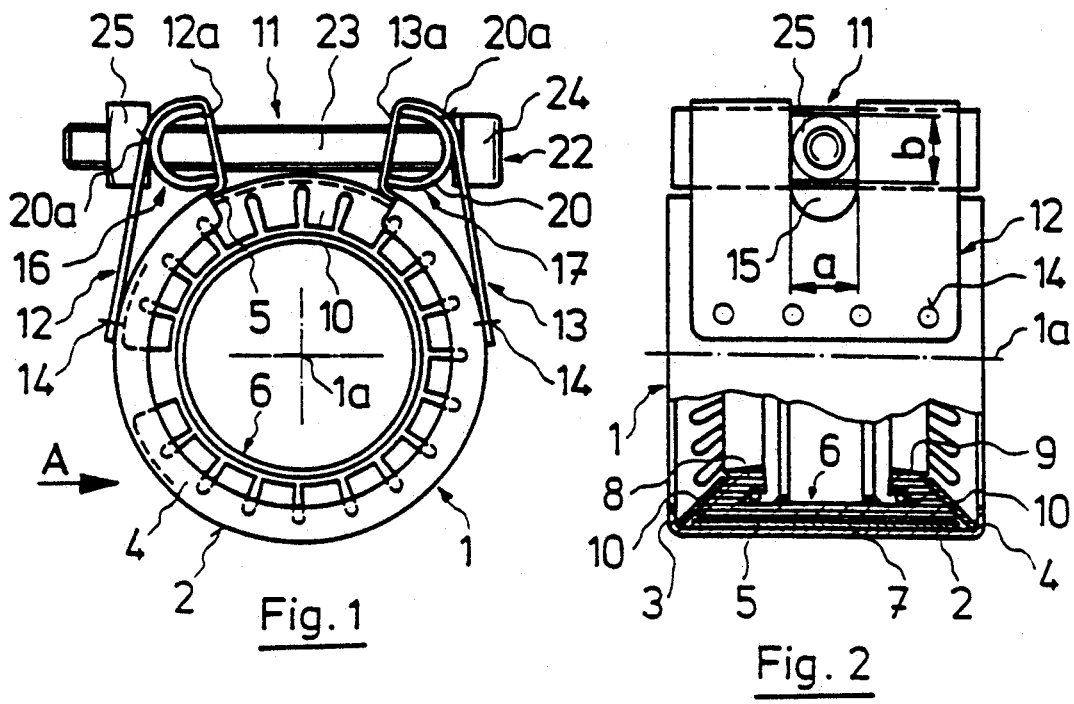
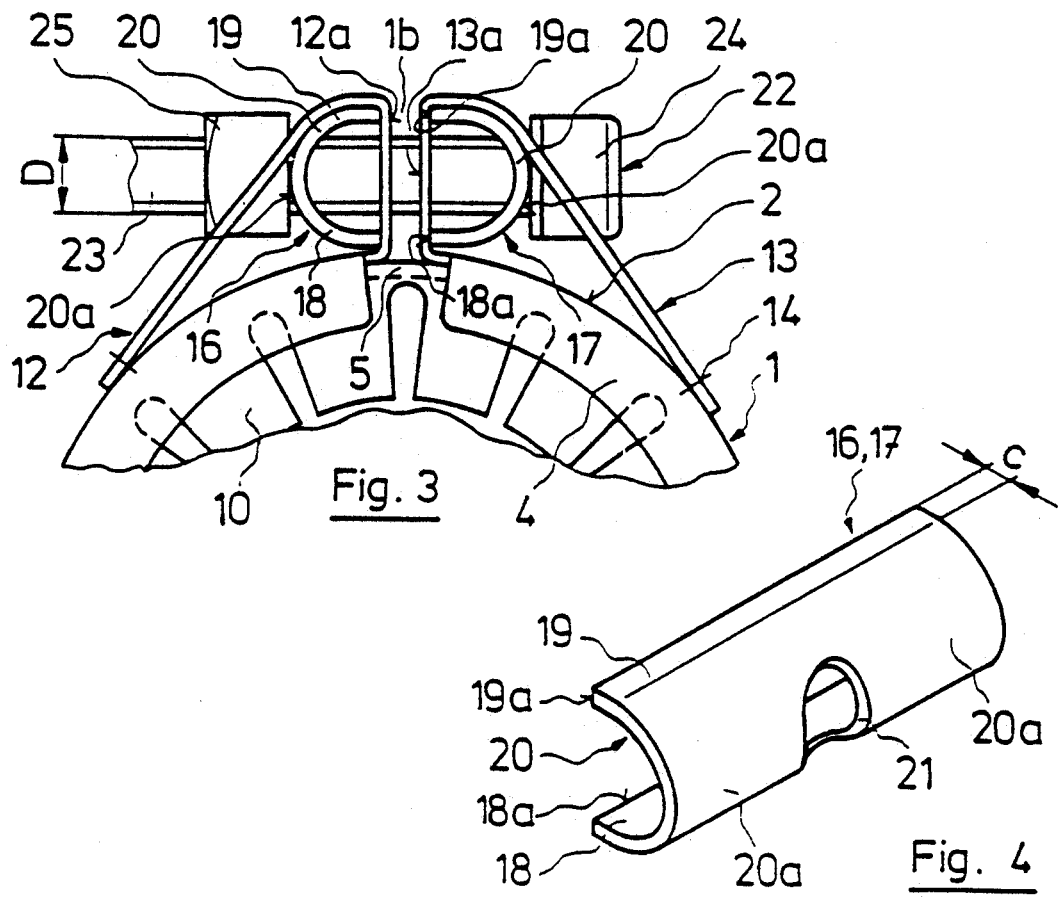

PIPE COUPLING

BACKGROUND OF THE INVENTION

The present invention relates to a pipe coupling of the type comprising an elastomeric sealing sleeve which before assembly is oversized relative to an outside diameter of a set of pipes to be coupled; an annular housing which encloses the sealing sleeve, which defines a longitudinal axis, and which is split in the direction of the longitudinal axis to define a housing gap; and a clamping device coupled to the housing and operative to draw the housing together in a peripheral direction to narrow the housing gap.

DE-A-2,428,101 (or corresponding U.S. Pat. No. 3,877,733) as well as EP-A-0,447,955 (or corresponding U.S. Pat. No. 5,137,305) disclose pipe couplings of the type described above. In the disclosed couplings, the clamping device for the housing has two threaded bolts which are parallel to one another and which extend through two cylindrical clamping bolts. The latter are positioned in clamping brackets which are attached to the housing on either side of the housing gap, which is bridged by an insert. The clamping bolts are provided with through holes, in the internal threads of which the threaded bolts are screwed. The cylindrical head of each of the threaded bolts bears on a clamping bolt, and defines a hexagonal socket.

To draw the housing together, which of course presses the sealing sleeve against the pipe ends, large clamping forces are necessary. In addition, upon assembly of the pipe coupling, the clamping bolts and thus also the clamping brackets have to cover a relatively long distance toward one another. The result of this is that quite considerable bending forces can be transmitted via the clamping bolts to the threaded bolts screwed into the latter, which bending forces can lead to bending of the threaded bolts. Not only are clamping forces generated which act in the peripheral direction of the housing, but forces are also generated which act in the radial direction and have a troublesome effect on the satisfactory drawing-together of the housing and thus on uniform bearing of the sealing sleeve against the pipe ends.

DE-U-8,512,007 describes a pipe-fracture clamp with which a seal enclosing a leaking point of a pipeline is put against the pipe line in a sealing manner. In this known pipe-fracture clamp, brackets are attached to a housing on either side of a housing gap which extends in the longitudinal direction, and cylindrical clamping bolts run through the brackets. Clamping screws pass through the clamping bolts with clearance, and the clamping screws carry a nut which is supported on the other clamping bolt. The relatively large housing gap is covered by an insert.

SUMMARY OF THE INVENTION

The object of the present invention, then, is to create a pipe coupling of the type mentioned at the beginning in which the clamping screw is as far as possible free of undesirable and troublesome bending-force effects, and in which the clamping forces acting on the housing act essentially only in the peripheral direction of the housing and can be introduced as close to the housing as possible.

According to this invention, a pipe coupling of the type described initially above is provided with at least one clamping screw, a nut carried by the screw, and a pair of clamping members, all included in the clamping device. The clamping members each define a generally U-shaped cross section which comprises an arched surface and which is shaped to receive the screw with clearance. Each of the clamping members are positioned on a respective side of the housing gap to engage the housing. The clamping screw passes through the clamping members and is oriented substantially tangentially to the housing. The clamping screw defines a head which is supported on the arched surface of one of the clamping members, and the nut threaded on the clamping screw is supported on the arched surface of the other of the clamping members.

The clearance between the shank of the clamping screw and the clamping members permits a relative movement between the latter and the screw shank transversely to the clamping direction, i.e., transversely to the longitudinal axis of the screw. During such transverse movement, which occurs when the screw is tightened and the clamping members are thus brought together, both the screw head and the nut can roll on the arched bearing surface of the respective U-shaped clamping members. This transverse movement is therefore not impeded by the parts (head and nut) of the clamping screw which bear on the clamping members. The clamping screw is therefore stressed essentially only in tension during clamping operations. This enables the clamping screw and accordingly also the clamping members to be of smaller dimensions, as a result of which material and weight can be saved.

Clamping forces applied during tightening of the clamping screw are oriented essentially in the direction of the longitudinal axis of the screw, and these forces are transmitted via the U-shaped clamping members to the housing in such a way that these forces act essentially in the peripheral direction of the housing and are introduced close to the periphery of the housing. This advantage is obtained in an especially advantageous manner in the embodiment defined by claims 2 and 4.

BRIEF DESCRIPTION OF THE DRAWINGS

An exemplary embodiment of the subject matter of the invention is described in more detail below with reference to the drawings, in which, purely schematically:

FIG. 1 shows a pipe coupling in front view,

FIG. 2 shows a view of the coupling of FIG. 1 in the direction of the arrow A, the bottom coupling half being shown, in section, FIG. 3 shows an enlarged view of a portion of the coupling of FIG. 1 with the clamping device in the restrained state, FIG. 4 shows a clamping member in perspective representation.

DETAILED DESCRIPTION OF THE PREFERRED EMBODIMENT

The pipe coupling shown in FIGS. 1-3 includes an annular housing 1 which is split in the direction of its longitudinal axis 1a. The housing 1 has a cylindrical shell 2 with side walls 3, 4 that are bent inwardly. The housing gap 1b (FIG. 3) is bridged in a known manner by means of an insert plate 5.

The housing 1 encloses an elastomeric sealing sleeve 6 which is roughly C-shaped in cross-section and is of a known type of construction. This sealing sleeve 6 has a web 7 which bears against the shell 2 of the housing 1.

Sealing lips 8, 9 (FIG. 2) extend from the web 7 toward the inside and extend toward one another. The sealing sleeve 6 bears laterally against laminated anchoring rings 10, each of which is supported on a respective side wall 3, 4 of the housing 1.

The housing 1 can be drawn together by means of a clamping device 11 in order to thus reduce its diameter. This clamping device 11 has two clamping brackets 12, 13 which are arranged at the side of the housing gap 1b and are designed like shovels. These clamping brackets 12, 13 are formed by a bent-back section which is in one piece with the shell 2 and is welded at its end to the shell 2 at the location designated by 14. Each clamping bracket 12, 13 has an approximately radially running, essentially flat wall section 12a, 13a. These two wall sections 12a, 13a face one another. Each clamping bracket 12, 13 is provided with a through opening 15 which in the present exemplary embodiment is designed like an elongated hole (see FIG. 2).

Each clamping bracket 12, 13 encloses a clamping member 16, 17 which is U-shaped in cross-section, and which includes two legs 18, 19 which are connected to one another via an arched part 20. These legs 18, 19 are essentially flat in the end areas designated by c in FIG. 4. The clamping members 16, 17 bear with the leg ends 18a, 19a against the flat wall sections 12a, 13a, respectively, of the clamping brackets 12, 13, as is clearly shown in FIGS. 1 and 3. A through hole 21 is formed in each clamping member 16, 17 (FIG. 4), and the shank 23 of a clamping screw 22 extends through the through holes 21. The through holes 21 are larger than the outside diameter D (FIG. 3) of the screw shank 23, at least in the peripheral direction of the corresponding clamping member 16, 17. This means that the screw shank 23 passes through these through holes 21 with radial clearance so that relative movement between screw shank 23 and the clamping members 16, 17 is possible. The screw head 24, which is cylindrical in this embodiment, bears against the arched outer surface 20a of the clamping member 17, while a nut 25 which is screwed onto the screw shank 23 is supported on the arched outer surface 20a of the opposite clamping member 16. As FIG. 2 shows, the width a of the through opening 15 is here preferably about the same as the width b across the flats of the nut 25, so that the nut 25 is held in the opening 15 in such a way as to be locked against rotation. The clamping screw 22 is tightened by means of a tool (not shown in the figures) which can be inserted into a hexagonal socket of the screw head 24.

As known, the sealing sleeve 6 has an oversize relative to the outside diameter of the pipes to be coupled. The coupling is pushed in the preassembled state onto the pipes and is pushed over a butt joint after the pipes are laid. The housing 1 is drawn together in the peripheral direction by turning the clamping screw 22 to reduce the diameter of the housing 1. As a result, the sealing sleeve 6, as known in the case of such pipe couplings, is pressed in a sealing manner against the outside of the pipes to be coupled.

FIG. 1 shows the pipe coupling in its opened state, whereas FIG. 3 shows the coupling housing I after complete assembly. The clamping members 16, 17 are moved toward one another while the housing 1 is drawn together. During this movement the clamping members 16, 17 change their position relative to the clamping screw 22, as is easily revealed from a comparison of the two states shown in FIGS. 1 and 3. As mentioned, the relative movement occurring in the process between the clamping members 16, 17 and the screw shank 23 is not impeded, because the screw shank 23 is passed with clearance through the through holes 21 of the clamping members 16, 17. Since both the screw head 24 and the nut 25 can roll in the process on the curved outer surface 20a of the clamping members 16, 17, this adapting movement between screw shank 23 and supporting members 16, 17 is not impaired. The screw shank 23 is essentially only stressed in tension, and the screw shank 23 does not need to absorb any bending forces, or only needs to absorb very small bending forces. Accordingly the screw shank 23 can also be of less sturdy design.

The forces exerted by the screw head 24 and nut 25 on the associated clamping members 16, 17 are transmitted by the latter to the flat wall sections 12a, 13a of the clamping brackets 12, 13, which, as mentioned, run approximately radially. This ensures that the clamping forces act essentially in the peripheral direction of the housing 1. The clamping forces can be introduced close to the periphery of the housing 1.

The width of the housing gap 1b in the fully-assembled state of the coupling can be kept smaller than in certain prior art pipe couplings of this type. This means that the insert plate 5 bridging the housing gap 1b can accordingly be of weaker design.

The clamping members can also be designed as partial cylinders having a cylindrical surface, serving as supporting surface for the screw head 24 or the nut 25, and a flat surface which bears against the flat surfaces 12a, 13a of the clamping brackets 12, 13. It goes without saying that these partial cylinders can be provided with a through opening for the screw shank 23, which through opening is larger than the outside diameter D of the screw shank 23. However, such an embodiment has the disadvantage that the application of force on the housing 1 is less favorable as compared with the curved, U-shape clamping members 16, 17 described above. In addition, if the clamping members are designed as partial cylinders, preferably half cylinders, the through hole for a given diameter D of the screw shank 23, ought to be substantially larger than in the case of U-shaped clamping members 16, 17 in order to permit the same degree of relative mobility between screw shank 23 and clamping members 16, 17. The bending resistance of the U-shaped clamping members 16, 17 can be substantially increased by increasing the width of the leg areas c.

I claim:

1. In a pipe coupling of the type comprising:
   an elastomeric sealing sleeve which before assembly is oversized relative to an outside diameter of a set of pipes to be coupled; and
   an annular housing which encloses the sealing sleeve, which defines a longitudinal axis, and which is split in the direction of the longitudinal axis to define a housing gap;
   the improvement comprising:
   a pair of clamping members, each of said clamping members defining a generally U-shaped cross-section which comprises an arched surface;
   means coupling each of said clamping members to the housing on a respective side of the housing gap to apply closing forces to the housing with the arched surfaces facing away from the housing gap;
   a clamping screw passing through the clamping members and oriented substantially tangentially to the housing, said clamping screw defining a head which is supported on the arched surface of one of the clamping members; and a nut threaded on the clamping screw and supported on the arched surface of the other clamping member;

said clamping members shaped to receive the clamping screw with clearance;

said clamping screw, nut and clamping members operative to draw the housing together in a peripheral direction to narrow the housing gap and to press the sealing sleeve against the set of pipes to be coupled.

2. The pipe coupling as claimed in claim 1, wherein said means comprises a pair of clamping brackets, each secured to the housing on a respective side of the housing gap, wherein the clamping members each comprise leg ends positioned on respective sides of the clamping screw, and wherein the leg ends of each clamping member are supported on the respective clamping bracket, thereby coupling the clamping members to the housing.

3. The pipe coupling as claimed in claim 2, wherein the clamping screw comprises a shank, and wherein the clamping members each define at least one through hole having an inside dimension in the peripheral direction of the clamping member, which through hole is larger than the outside diameter of the shank.

4. The pipe coupling as claimed in claim 2, wherein each of the clamping brackets comprises a respective loop defining a wall section which faces the housing gap and is essentially flat, which extends approximately in a radial direction, and which serves as a bearing surface for said leg ends of said respective clamping members.

5. The pipe coupling as claimed in claim 2, wherein at least one of the clamping brackets defines a through opening having a first width, and wherein the nut defines flats having a second width which is approximately the same as the first width.

6. The pipe coupling as claimed in claim 1, wherein the clamping screw comprises a shank, and wherein the clamping members each define at least one through hole having an inside dimension in the peripheral direction of the clamping member, which through hole is larger than the outside diameter of the shank.

7. The pipe coupling as claimed in claim 1 wherein the sealing sleeve defines a generally C-shape in cross-section and comprises sealing lips which extend toward one another and can be brought to bear in a sealing manner against respective ones of the pipes.

* * * * *